United States Patent
Frye et al.

(10) Patent No.: US 11,412,124 B1
(45) Date of Patent: Aug. 9, 2022

(54) MICROSEQUENCER FOR RECONFIGURABLE FOCAL PLANE CONTROL

(71) Applicant: Ball Aerospace & Technologies Corp., Boulder, CO (US)

(72) Inventors: John Frye, Erie, CO (US); Sandor Demosthenes, Longmont, CO (US); Rob Philbrick, Erie, CO (US); Scot McArthur, Boulder, CO (US); David T. Ellis, Erie, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 169 days.

(21) Appl. No.: 16/806,367

(22) Filed: Mar. 2, 2020

Related U.S. Application Data

(60) Provisional application No. 62/812,595, filed on Mar. 1, 2019.

(51) Int. Cl.
| | |
|---|---|
| *H04N 5/232* | (2006.01) |
| *G03B 9/16* | (2021.01) |
| *G03B 9/62* | (2021.01) |
| *H04N 5/335* | (2011.01) |
| *G06T 5/00* | (2006.01) |

(52) U.S. Cl.
CPC .............. *H04N 5/232* (2013.01); *G03B 9/16* (2013.01); *G03B 9/62* (2013.01); *G06T 5/003* (2013.01); *H04N 5/335* (2013.01)

(58) Field of Classification Search
CPC .......... H04N 5/232; H04N 5/335; G03B 9/16; G03B 9/62; G06T 5/003

USPC ......................................................... 348/117
See application file for complete search history.

(56) References Cited

U.S. PATENT DOCUMENTS

| | | |
|---|---|---|
| 5,588,073 A | 12/1996 | Lee et al. |
| 5,719,794 A | 2/1998 | Altshuler et al. |
| 5,960,391 A | 9/1999 | Tateishi et al. |
| 6,075,991 A | 6/2000 | Raleigh et al. |

(Continued)

FOREIGN PATENT DOCUMENTS

CN 108875595 11/2018

OTHER PUBLICATIONS

U.S. Appl. No. 16/597,411, filed Oct. 9, 2019, Schmidt et al.

(Continued)

*Primary Examiner* — On S Mung
(74) *Attorney, Agent, or Firm* — Sheridan Ross P.C.

(57) ABSTRACT

Systems and methods for operating a focal plane array are provided. The operations can be stored as command sequences stored in a command queue established in memory provided as part of reconfigurable focal plane electronics. Each command sequence can include definitions of a plurality of image frames that are executed in series. The configurations of the defined frames can be the same as or different from one another. Moreover, the frame definitions can specify a number of focal plane array parameters, such as gain, full frame or window, and integration time. The sequence of focal plane array parameters can be provided to the focal plane array as a command stream at the direction of a state machine implemented by the reconfigurable focal plane electronics. New commands containing different frame commands can be loaded into the command queue without requiring reconfiguration of the electronics.

20 Claims, 7 Drawing Sheets

(56) References Cited

U.S. PATENT DOCUMENTS

| | | |
|---|---|---|
| 6,252,627 B1 | 6/2001 | Frame et al. |
| 6,437,692 B1 | 8/2002 | Petite et al. |
| 6,597,394 B1 | 7/2003 | Duncan et al. |
| 6,820,053 B1 | 11/2004 | Ruwisch |
| 7,020,501 B1 | 3/2006 | Elliott et al. |
| 7,590,098 B2 | 9/2009 | Ganesh |
| 8,019,544 B2 | 9/2011 | Needelman et al. |
| 8,583,371 B1 | 11/2013 | Goodzeit et al. |
| 8,929,936 B2 | 1/2015 | Mody et al. |
| 9,073,648 B2 | 7/2015 | Tsao et al. |
| 9,191,587 B2 | 11/2015 | Wright et al. |
| 9,294,365 B2 | 3/2016 | Misra et al. |
| 9,449,374 B2 | 9/2016 | Nash et al. |
| 9,702,702 B1 | 7/2017 | Lane et al. |
| 9,924,522 B2 | 3/2018 | Gulati et al. |
| 9,927,510 B2 | 3/2018 | Waldron et al. |
| 10,021,313 B1 | 7/2018 | Chen et al. |
| 10,048,084 B2 | 8/2018 | Laine et al. |
| 10,271,179 B1 | 4/2019 | Shima |
| 10,970,520 B1 | 4/2021 | Kim et al. |
| 2005/0049876 A1 | 3/2005 | Agranat |
| 2005/0160406 A1* | 7/2005 | Duncan .................. H04N 19/61 717/127 |
| 2005/0228660 A1 | 10/2005 | Schweng |
| 2006/0030332 A1 | 2/2006 | Carrott et al. |
| 2007/0010956 A1 | 1/2007 | Nerguizian et al. |
| 2008/0020354 A1 | 1/2008 | Goree et al. |
| 2008/0045235 A1 | 2/2008 | Kennedy et al. |
| 2008/0293353 A1 | 11/2008 | Mody et al. |
| 2009/0179142 A1 | 7/2009 | Duparre et al. |
| 2009/0197550 A1 | 8/2009 | Huttunen et al. |
| 2009/0268619 A1 | 10/2009 | Dain et al. |
| 2010/0091017 A1 | 4/2010 | Kmiecik et al. |
| 2012/0071105 A1 | 3/2012 | Walker et al. |
| 2012/0072986 A1 | 3/2012 | Livsics et al. |
| 2012/0163355 A1 | 6/2012 | Heo et al. |
| 2012/0167144 A1 | 6/2012 | Avison-Fell |
| 2012/0202510 A1 | 8/2012 | Singh |
| 2012/0238201 A1 | 9/2012 | Du et al. |
| 2012/0238220 A1 | 9/2012 | Du et al. |
| 2014/0218520 A1 | 8/2014 | Teich et al. |
| 2014/0232871 A1 | 8/2014 | Kriel et al. |
| 2014/0282783 A1 | 9/2014 | Totten et al. |
| 2014/0329540 A1 | 11/2014 | Duggan et al. |
| 2015/0009072 A1 | 1/2015 | Nijsure |
| 2016/0101779 A1 | 4/2016 | Katoh |
| 2016/0173241 A1 | 6/2016 | Goodson et al. |
| 2016/0187477 A1 | 6/2016 | Wang |
| 2017/0120906 A1 | 5/2017 | Penilla et al. |
| 2017/0123429 A1 | 5/2017 | Levinson et al. |
| 2017/0366264 A1 | 12/2017 | Riesing et al. |
| 2018/0019910 A1 | 1/2018 | Tsagkaris et al. |
| 2018/0025641 A1 | 1/2018 | LaVelle et al. |
| 2018/0033449 A1 | 2/2018 | Theverapperuma et al. |
| 2018/0053108 A1 | 2/2018 | Olabiyi et al. |
| 2018/0082438 A1 | 3/2018 | Simon et al. |
| 2018/0107215 A1 | 4/2018 | Djuric et al. |
| 2018/0149730 A1 | 5/2018 | Li et al. |
| 2018/0268571 A1 | 9/2018 | Park et al. |
| 2018/0293893 A1 | 10/2018 | Yang et al. |
| 2018/0324595 A1 | 11/2018 | Shima |
| 2019/0049955 A1 | 2/2019 | Yabuuchi et al. |
| 2019/0066713 A1 | 2/2019 | Mesgarani et al. |
| 2019/0122689 A1 | 4/2019 | Jain et al. |
| 2019/0164430 A1 | 5/2019 | Nix |
| 2019/0213887 A1 | 7/2019 | Kitayama et al. |
| 2019/0294108 A1 | 9/2019 | Ozcan et al. |
| 2019/0318725 A1 | 10/2019 | Le Roux et al. |
| 2019/0322282 A1 | 10/2019 | Theodosis et al. |
| 2019/0353741 A1 | 11/2019 | Bolster, Jr. et al. |
| 2019/0363430 A1 | 11/2019 | Wang et al. |

OTHER PUBLICATIONS

U.S. Appl. No. 16/668,826, filed Oct. 30, 2019, Shima.

U.S. Appl. No. 16/693,992, filed Nov. 25, 2019, Tchilian.

U.S. Appl. No. 16/745,725, filed Jan. 17, 2020, Tchilian et al.

"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].

Buchheim "Astronomical Discoveries You Can Make, Too!" Springer, 2015, pp. 442-443.

Ma et al. "Attitude-correlated frames approach for a star sensor to improve attitude accuracy under highly dynamic conditions," Applied Optics, Sep. 2015, vol. 54, No. 25, pp. 7559-7566.

Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.

Nair et al. "Accelerating Capsule Networks with Tensor Comprehensions," Princeton, May 2018, 8 pages.

Ni et al. "Attitude-correlated frames adding approach to improve signal-to-noise ratio of star image for star tracker," Optics Express, May 2019, vol. 27, No. 11, pp. 15548-15564.

Wang "Research on Pruning Convolutional Neural Network, Autoencoder and Capsule Network," before Oct. 9, 2018, 11 pages.

Wang et al. "An Optimization View on Dynamic Routing Between Capsules," ICLR 2018 Workshop, Feb. 2018, 4 pages.

* cited by examiner

MICROSEQUENCER FOR RECONFIGURABLE FOCAL PLANE CONTROL

CROSS-REFERENCE TO RELATED APPLICATIONS

This application claims the benefit of U.S. Provisional Patent Application Ser. No. 62/812,595, filed Mar. 1, 2019, the entire disclosure of which is hereby incorporated herein by reference.

FIELD

Control systems and methods for operating focal plane arrays are provided.

BACKGROUND

Digital imaging systems incorporating focal plane arrays having thousands or millions of photosensitive sites or pixels have become common in terrestrial cameras, and in cameras used in remote imaging applications, such as on satellites or autonomous vehicles. The focal plane arrays have the ability to operate in different modes. In particular, space-grade digital focal plane arrays (DFPAs) are highly configurable, offering a plethora of modes and settings. For example, they can be operated at different gain levels, and over different integration or exposure times. In addition, it is possible to operate focal plane arrays over different effective resolutions and using different areas of the array. These DFPAs are generally configured over a custom serial interface and usually require cycle-accurate synchronization with other clocks and/or control strobes provided to the sensor. Given this requirement, frame-to-frame and intra-frame commanding is not a supported concept of operations (CONOPS) in typical missions. In addition, control electronics have typically been incapable of enabling a full variety of imaging configurations that may be desirable using a contemporary focal plane array. Moreover, previously available control electronics have been incapable of maximizing temporal resolution of focal plane arrays.

SUMMARY

In accordance with embodiments of the present disclosure, an imaging system incorporating reconfigurable focal plane electronics is provided. The system generally includes an image sensor, and in particular a digital focal plane array (DFPA). In addition, the system includes a microsequencer that interfaces with and controls operations of the DFPA. The system can also include or communicate with a host, from which commands regarding desired parameters for image acquisition operations are provided to the microsequencer, which in turn provides appropriate operational parameters or operations to the DFPA for execution of the image acquisition operations. In accordance with at least some embodiments, commands can be transmitted to the imaging system from a control authority that is located remotely relative to the imaging system. For example, the host system, DFPA and microsequencer can be located on a satellite or other vehicle, while the control authority can be located at a terrestrial location and can be in wireless communication with the imaging system.

In accordance with at least some embodiments of the present disclosure, the microsequencer is implemented by a reconfigurable focal plane electronics (RFPE) architecture. The microsequencer operates to command digital FPAs (DFPAs), including space-grade DFPAs that are highly configurable, and that offer a plethora of modes and settings. A microsequencer implemented by the reconfigurable focal plane electronics in accordance with embodiments of the present disclosure provides a high-speed interface and sophisticated control logic that allows the DFPA settings to be changed on a frame-to-frame or even intra-frame basis, allowing for dynamic reconfiguration of the DFPA and complex imaging sequences including high-dynamic range modes, low noise sample-up the ramp, or staggering window collects.

In accordance with further embodiments of the present disclosure, the microsequencer implements a serial interface providing cycle-accurate synchronization with other clocks and/or control strobes provided to the sensor. Moreover, frame-to-frame and intra-frame commanding is supported. The microsequencer can be implemented using RFPEs that include a field programmable gate array (FPGA), and can provide the real-time, frame-to-frame commanding capability in an integrated fashion.

Methods in accordance with embodiments of the present disclosure include providing a DFPA and microsequencer. The microsequencer contains a plurality of commands that can be applied to the DFPA. In response to receiving imaging task commands from a host related to the operation of the DFPA, the microsequencer operates to determine a command, set of commands, or sequence of commands that should be selected for implementing the task. The commands selected by the microsequencer can be stored locally, and can contain particular registers and values appropriate for the associated DFPA. Commands are formatted and passed to the DFPA through operation of a state machine.

Additional features and advantages of embodiments of the present disclosure will become more readily apparent from the following description, particularly when taken together with the accompanying drawings.

DETAILED DESCRIPTION

Figure 1:
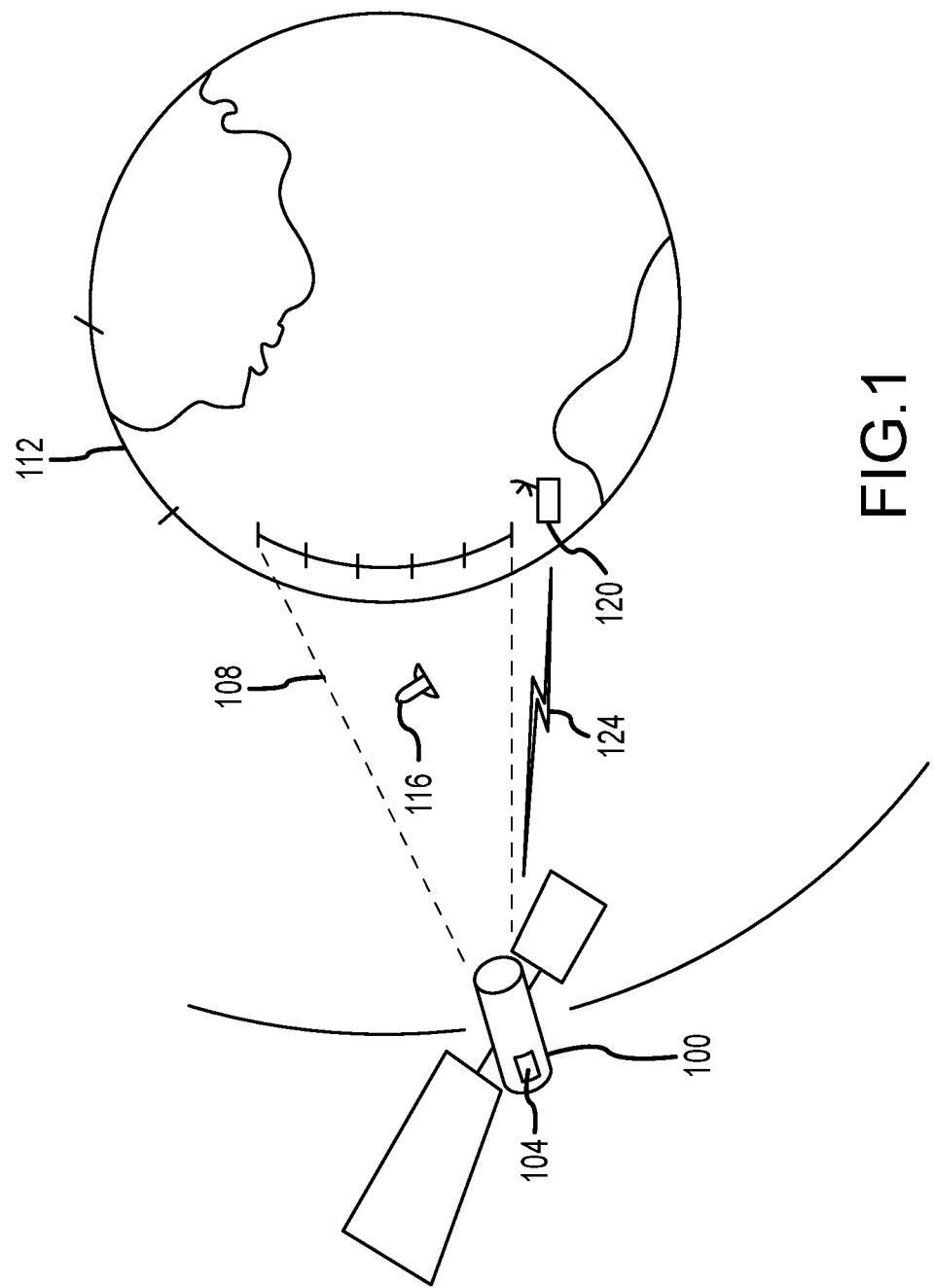
FIG. 1 depicts an imaging system incorporating a focal plane array and an associated microsequencer in an operational scenario in accordance with embodiments of the present disclosure.

FIG. 1 depicts a platform 100 incorporating or carrying all or portions of an imaging system 104 that includes a digital focal plane array (DFPA) and reconfigurable focal plane electronics (RFPE) in accordance with embodiments of the present disclosure. In addition, a field of view 108 of the imaging system 104 is depicted. In an example implementation, the imaging system 104 is operated to obtain images of selected target areas within the field of view 108 of the imaging system 104. As can be appreciated by one of skill in the art, in different scenarios it can be desirable to operate the imaging system 104 using different imaging modes. For example, in some instances, such as when capturing an image from a large section of the earth or another planetary body 112, or when capturing an image from a large area of space, a wide field of view using the entire image sensor area is desirable. In other instances, such as when tracking a small object, such as a space craft 116, capturing an image from a window consisting of a sub-set of the pixels of the image sensor and a relatively narrow field of view is desirable. In addition, it can be desirable to control and select the frame rate at which the DFPA is operated, the location of a window of a sub-set of the DFPA pixels, wavelength mode, or other parameters, based on a particular imaging task or scenario.

Although the platform 100 depicted in the figure is shown as a satellite, a platform 100 can include other types of vehicles or systems, such as but not limited to space craft, airplanes, unmanned aircraft, balloons, aerostats, terrestrial vehicles, or static platforms. In accordance with at least some embodiments of the present disclosure, the imaging system 104 is operated in association with a control authority 120 that is in communication with the imaging system over a communication link 124, but that is located remotely from the imaging system 104. For example the control authority 120 can be an earth based system in communication with the imaging system 104 over a wireless communication link 124. In accordance with embodiments of the present disclosure, the control authority 120 can send control signals to the imaging system 104, automatically or in response to a command from a user, and can receive image data and associated status telemetry data from the imaging system.

Figure 2:
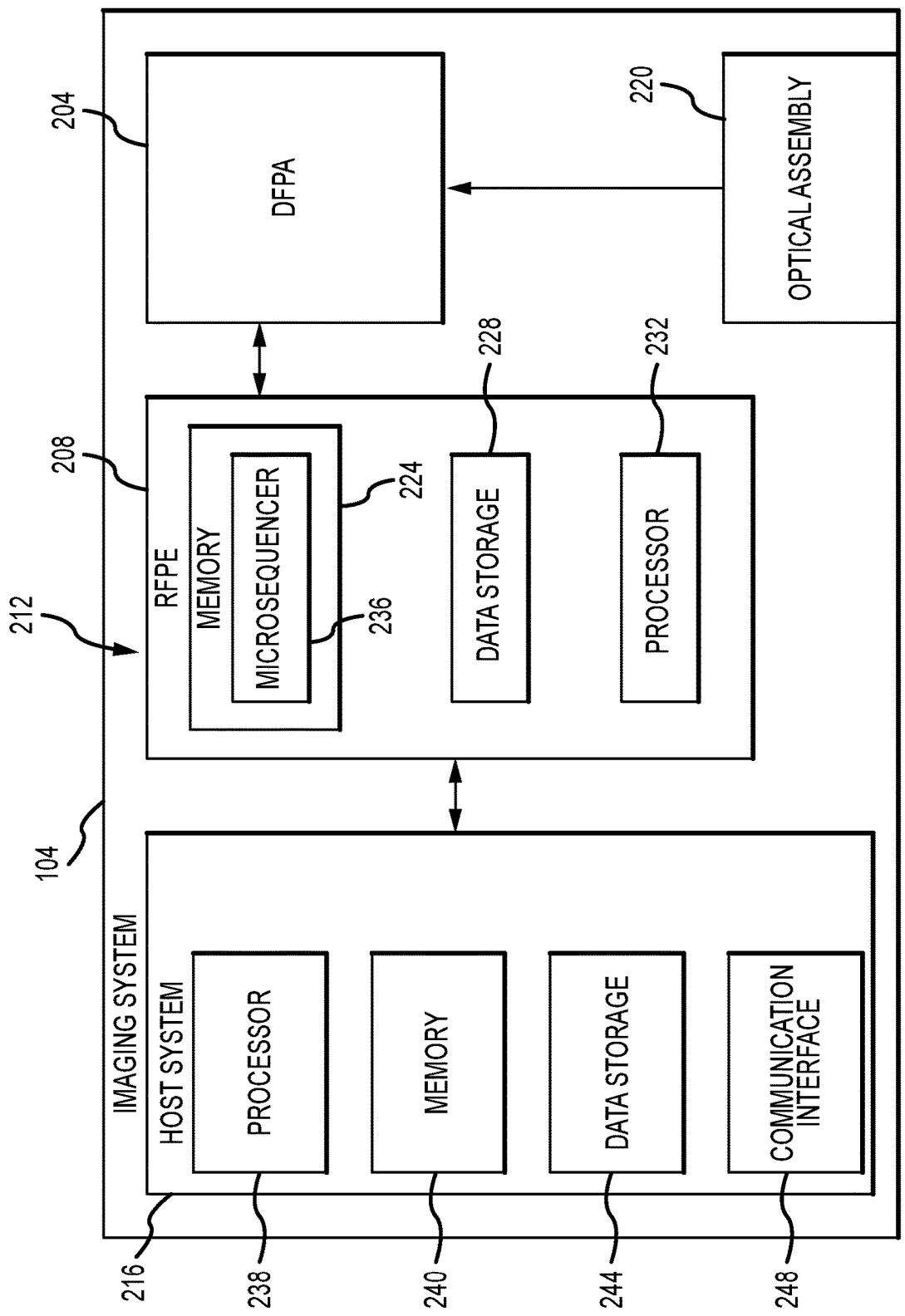
FIG. 2 is a block diagram depicting components of an imaging system incorporating a microsequencer in accordance with embodiments of the present disclosure.

FIG. 2 is a block diagram depicting components of the imaging system 104. The imaging system 104 includes a digital focal plane array 204, reconfigurable focal plane electronics 208 implementing a microsequencer 212, and a host system 216. In addition, the imaging system can include a lens or optical assembly 220 for focusing collected light onto the focal plane array 204. In operation, the host system 216 sends commands to the microsequencer 212. The host system 216 can also operate to convey user or control authority commands, and a system time or clock signal, to the microsequencer 212. The microsequencer 212 in turn provides instructions and signals to the digital focal plane array 204 that configure the digital focal plane array 204 appropriately, and that operate the digital focal plane array 204 to obtain an image in accordance with the host system 216 instructions. Moreover, the microsequencer 212 can control the digital focal plane array 204 to obtain a sequence of images in response to a command received from the host 216.

As an example, but without limitation, the digital focal plane array 204 can include a backside illuminated CMOS image sensor having a 1024×1024 two-dimensional array of pixels. As can be appreciated by one of skill in the art after consideration of the present disclosure, in addition to a focal plane array formed from a plurality of photosensitive sites or pixels, the focal plane array 204 can incorporate or be associated with driver and analog-to-digital conversion (ADC) circuitry, enabling the focal plane array 204 to provide a digital output representative of an amplitude or intensity of light detected at each pixel within the focal plane array 204.

The RFPE 208 can include memory 224, data storage 228, and a processor 232. The RFPE memory 224 can include volatile or non-volatile solid-state memory, such as DRAM, SDRAM, or the like. The RFPE memory 224 can provide short or long term storage for instructions 236 that are executed by the RFPE processor 232 to implement operations or functions of the DFPA 204 and the RFPE 208 and imaging system 104 more generally. The RFPE memory 224 can also store configurable parameters, image commands, including image command that are particular to the DFPA 204, intermediate data products, output data, and the like. The RFPE memory 224 can additionally provide a first-in first-out memory function. In accordance with further embodiments of the present disclosure, the application instructions 236 can include instructions that implement the microsequencer 212. The RFPE data storage 228 generally includes non-volatile data storage, such as flash memory, solid-state drives, hard disk drives, optical disk drives, erasable programmable ROM, and the like. The RFPE data storage 228 can provide short or long term storage for application instructions 236 that are executed by the RFPE processor 232, configurable parameters, intermediate data products, output data, and the like. In accordance with still other embodiments of the present disclosure, the RFPE data storage 228 can store a library of image commands or frame commands for controlling operation of the DFPA 204.

The RFPE processor 232 can include one or more field-programmable gate arrays (FPGAs), multi-threaded processors, graphics processing units (GPUs), general purpose processors, or the like. For example, the RFPE processor 232 can be formed from an FPGA processor, alone in combination with multiple GPUs or other devices. In accordance with further embodiments of the present disclosure, the RFPE 208 can include a plurality of boards or cards, with each board including memory 224 and a GPU or other processor 232.

The host system 216 can include a processor 238, memory 240, data storage 244, and a communications interface 248. The processor 238 can include a general purpose programmable processor or the like. The memory 240 can include, for example, volatile or non-volatile memory, and can provide short or long-term storage for application programming or instructions, control parameters, intermediate data products, data, or the like. The data storage 244 generally includes non-volatile storage for application programming or instructions, control parameters, intermediate data products, data, or the like. The communications interface 248 can support the passing of commands to and the receiving of data from the RFPE 212. In addition, the communications interface 248 can support communications between the imaging system 104 and remote systems, control authorities 120, or communication nodes.

In operation, the host system 216 sends commands to the RFPE 208. The commands can be stored locally by the host system 216, can be transmitted to the host system 216 from a control authority 120, and/or can be generated by the host system 216. In accordance with embodiments of the present disclosure, the commands can include imaging tasks that define aspects of imaging operations to be performed by the imaging system 104. The RFPE 208 itself, or through a microsequencer 212 function implemented by the RFPE 208, in turn provides instructions to the digital focal plane array 204 that configure the digital focal plane array 204 appropriately for completing imaging tasks, and that operates the digital focal plane array 204 to obtain an image in accordance with the imaging tasks or other instructions received from the host system 216 or a control authority 120. Moreover, the microsequencer 212 can control the digital focal plane array 204 to obtain a sequence of images in response to a command received from the host system 216. The host system 216 can also perform functions related to operation of the platform 100 and/or the imaging system 104, including but not limited to: operations relating to the positioning of the platform 100; receiving and acting on instructions from a command center 120; transmitting images collected by the imaging system 104; transmitting the results of image analysis performed by the RFPE 208; and performing actions, including but not limited to actions concerning the positioning of the platform 100, and actions taken by the platform 100 relative to objects 116 within a scene.

Figure 3:
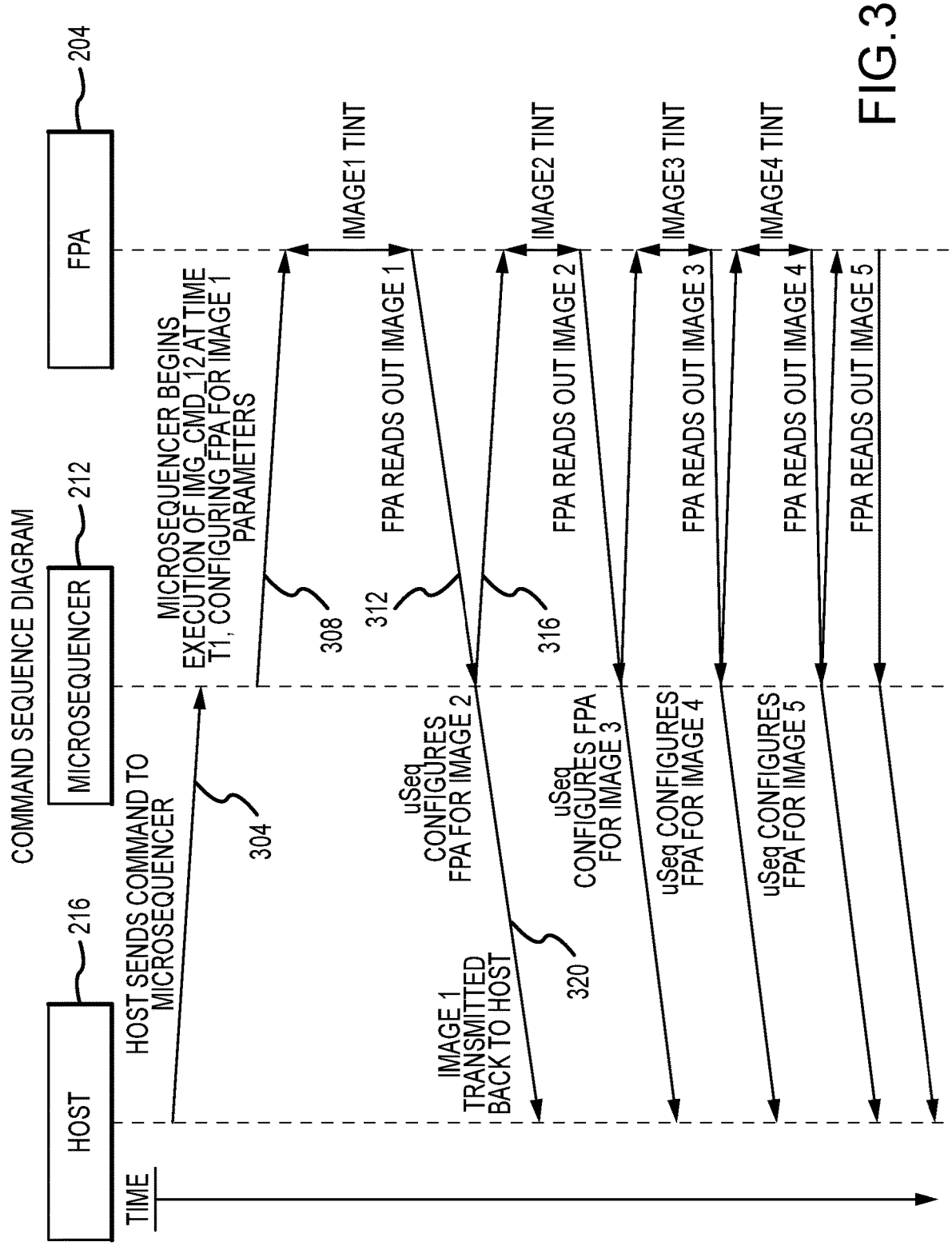
FIG. 3 is a diagram of an example sequence of commands between a host, microsequencer, and DFPA in accordance with embodiments of the present disclosure.

With reference now to FIG. 3, an example of a sequence of commands sent between the host system 216, the microsequencer 212, and the digital focal plane array 204 is illustrated. Initially, at step 304, the host system 216 sends a command to the microsequencer 212. The command from the host system 216 can be an imaging task that includes or implies a sequence of time commands, such as combining multiple image collects. Moreover, the digital focal plane array 204 can be placed in a unique gain mode, setting of window modes, and/or a unique integration period for some or all of the image collects in a sequence. The images within a sequence can be combined to form a single composite image with extended dynamic range. Alternatively or in addition, multiple images taken with identical settings can be co-added to improve signal-to-noise ratio. Moreover, hyperspectral line imagery can be summed to form 2D spatial images. The microsequencer 212 then begins execution of an image command selected as complying with the received imaging task to configure the digital focal plane array 204 to obtain an image according to the directed or appropriate parameters (step 308).

The image collected according to the first image command is read out from the focal plane array 204 to the microsequencer 212 (step 312). In accordance with embodiments of the present disclosure, the image frames are each associated with an execution time tag, enabling different images to be precisely synchronized with platform 100 system time or host payload time. Alternatively, commands can be executed by the microsequencer 212 autonomously. The microsequencer 212 then configures the focal plane array 204 for a second or next image (step 316). The next image can be taken as a result of the execution of an image command selected as complying with the same imaging task that resulted in the selection of the first image command, or it can be selected in response to another imaging task. The configuration of the focal plane array 204 for the second image can be the same as or different from the configuration used for the first or previous image. Accordingly, the interframe configuration of a sequence of frames can be changed. In accordance with still further embodiments, the settings can be changed during an integration period and/or while the commands for a frame are being executed. In addition, the image data obtained by the focal plane array is transmitted back to the host (step 320). This process can continue, with each subsequent image being the same as or different from the preceding image.

Figure 4:
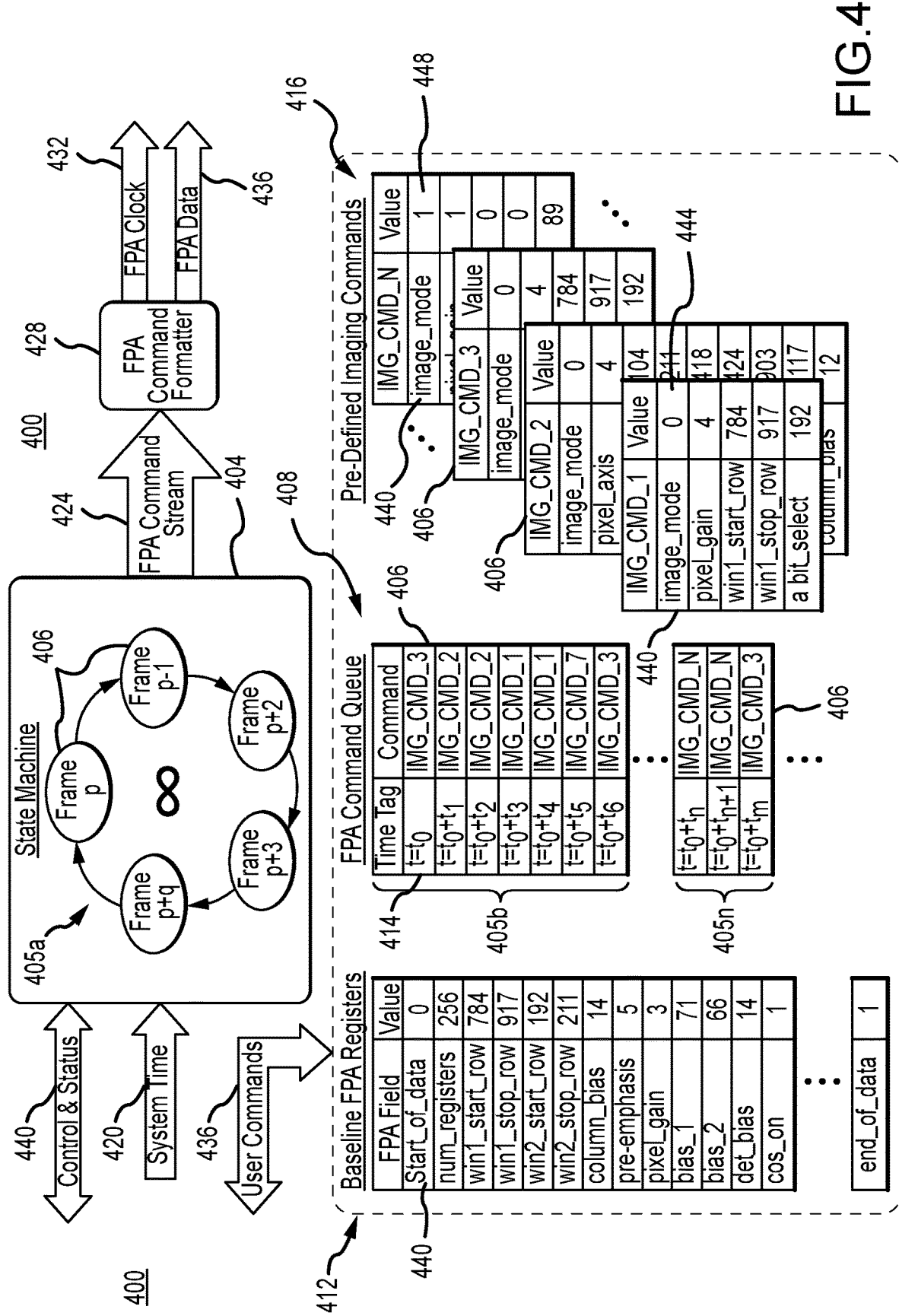
FIG. 4 depicts a command and state machine structure implemented by a microsequencer in accordance with embodiments of the present disclosure.

FIG. 4 depicts a command and state machine structure 400 implemented by an imaging system 104 incorporating a microsequencer 212 of an RFPE 208 in accordance with embodiments of the present disclosure. Central to the structure 400 is the state machine 404, which cycles through operational sequences 405 established as a collection of one or more individual frame commands 406.

The imaging commands 406 can include predefined imaging commands 406 that can be selected for inclusion in a command sequence 405 by a user or in response to a task received from a user from a library or store of such commands 416 maintained in memory 224 or data storage 228 included as part of the reconfigurable focal plane electronics 208, stored in memory 240 or data storage 244 included in the host system 216, or stored in an external memory or data storage. Alternatively or in addition, imaging commands 406 can be customized or otherwise created by a user or control authority 120, either through modifications to predefined commands 406, or through the creation of entirely new commands. Each image command 406 generally includes DFPA 204 operating parameters that are applied in connection with acquiring a frame or a set of frames of image data by the associated DFPA 204. In accordance with embodiments of the present disclosure, the image commands 406 included in a particular instance of a microsequencer 212 are specific to the DFPA 204 with which the microsequencer is deployed. Accordingly, different sets of frame commands 406 are typically associated with different DFPAs 204.

The frame commands 406 can include one or more fields that are each associated with a least one DFPA 204 operating parameter and an associated value. In accordance with at least some embodiments of the present disclosure, a stack of baseline register values 412 that contain fields of configuration parameters 440 and corresponding values 444 is maintained in the memory 224 or data storage 228 of the RFPE 208. In such embodiments, each image command 406 only includes a field for a particular parameter 440 in which the commanded value 444 is different than a baseline or default value for that parameter. Moreover, the given value for each parameter can be a difference or deviation from the baseline register value, referred to herein as a difference value 448. Accordingly, execution of the individual image definitions stored as part of image commands 406 can be made with reference to the baseline register values. Alternatively, the individual frame definitions can be set forth in absolute terms, in which case the baseline values need not be stored.

Each command sequence 405 can be generated or established in response to user commands 436 that specify desired parameters for an imaging task that includes the acquisition of one or more images, but that are not themselves capable of operating the DFPA 204. The commands 406 suitable for implementing the operations directed by a particular user command 436 regarding an imaging task can be selected by operation of the microsequencer 212. The set of commands 406 forming the command sequences 405 are placed in a command queue 408 established locally in memory 224 or data storage 228. From the command queue 408, a set of image commands 406 included in a first command sequence 405a is loaded into the state machine 404. In accordance with embodiments of the present disclosure, only the commands 406 included in a single command sequence 405 are loaded into the state machine 404 at any one point in time. In such embodiments, any other command sequences 405 remain in the command queue 408. For example, as shown in the figure, a second command sequence 405b and an nth command sequence 405n are maintained in the command queue 408 while the first command sequence 405a is loaded into the state machine 404. Alternatively, commands 406 in series from a command queue 406. Any number of specific command sequences 405, containing any number of frame definitions 406, can be stored, subject to the limitations of the memory 224 and data storage 228. In addition, specific command sequences 405 can be repeated or arranged in any order.

The state machine 404 can be operated in connection with control and status commands 410 that are passed between the host system 216 and the RFPE 208 implementing the state machine 404. The control and status commands 410 can include commands to initiate or stop the execution of frame commands. When operation is initiated, the state machine 404 loads the next command sequence 405 in the command queue 408, here sequence 405a, shown already loaded in the state machine 404, and cycles through the image commands or definitions 406. In this example, the first command sequence 405a includes five frame commands 406. Additional command sequences 405, i.e. any command sequences 405 placed in the RFPE 208 but not currently being executed by the state machine 404, remain in the queue 408. The image commands 406 included within a particular command sequence 405 are executed using timing information provided by a system clock or time source 420. In addition, the state machine 404 supplies a focal plane array command stream 424 consisting of the frame parameters according to supplied system timing information 420 to a focal plane array command formatter 428. The system timing information can be provided by the host system 216. The focal plane array command formatter 428, in accordance with the least some embodiments of the present disclosure, is implemented through application programming executed by the microsequencer 212. Alternatively, the focal plane array command formatter 428 can be implemented separately, for example as a field programmable gate array or controller provided separately from other components of the microsequencer 212. The focal plane array command formatter 428 provides a DFPA clock signal 432 and DFPA data 436, in the form of the parameter information, to the focal plane array 204, to thereby control operation of the focal plane array 204.

Accordingly, an RFPE 208 as disclosed herein provides cycle-accurate synchronization of image acquisition and DFPA 204 operation with system clocks and control strobes. More particularly, the microsequencer 212 functions and capabilities enable real-time, frame-to-frame commanding of the associated DFPA 204. The image commands 406 maintained locally in the command store 416 further allow a control authority 120 or user to select or command image operations, without requiring that detailed control parameters be uploaded to the RFPE 208. Moreover, the image commands 406 that are stored locally in the command store 416 can include commands that involve the acquisition of multiple image frames, having the same or different image parameters. Accordingly, aspects of the control of the associated DFPA 204 are abstracted by the RFPE 208.

Figure 5:
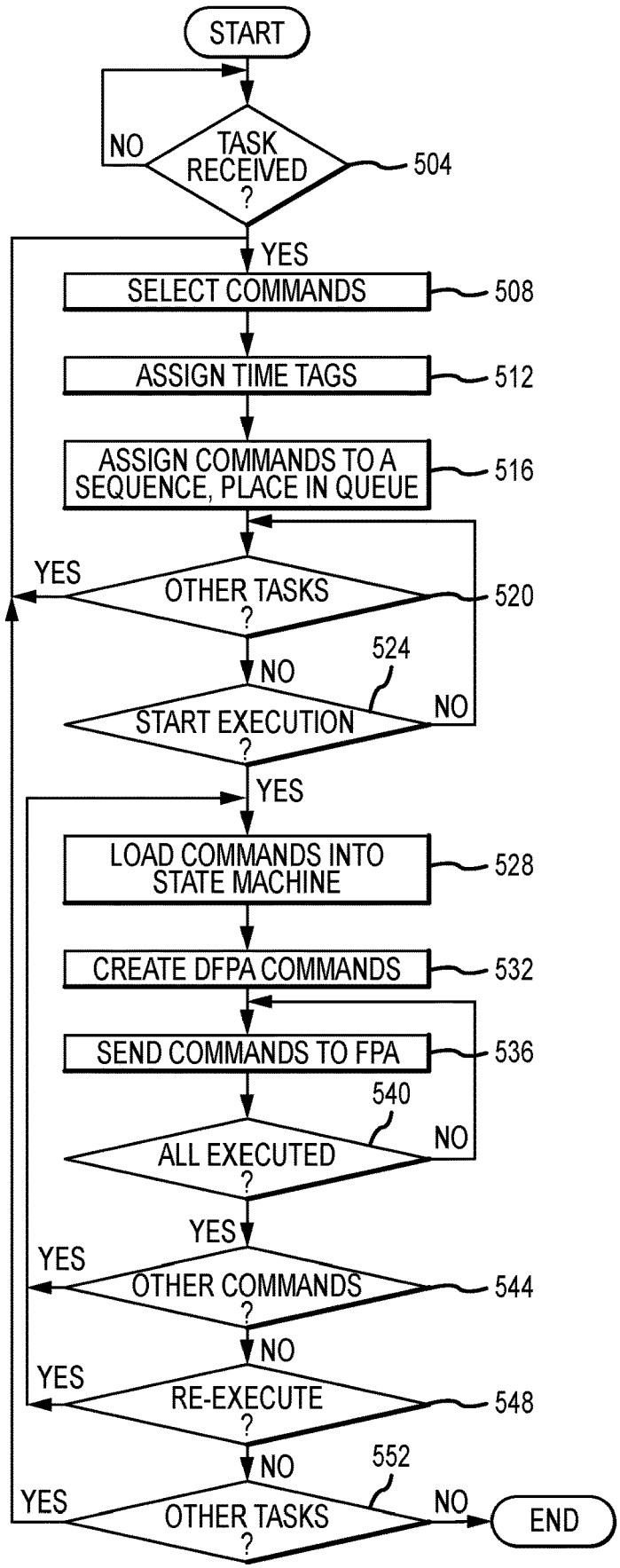
FIG. 5 is a flow diagram illustrating aspects of the operation of an imaging system in accordance with embodiments of the present disclosure.

FIG. 5 is a flow diagram illustrating aspects of the operation of a microsequencer 212 implemented by an RFPE 208 in accordance with embodiments of the present disclosure. Initially, at step 504, a determination is made as to whether an imaging task has been received. Until an imaging task is received, the process can idle at step 504. An imaging task can include a description of a desired imaging operation in high level terms. For instance, the imaging task can specify the acquisition of image data from a selected area on the surface of the earth 112 as the platform 100 moves relative to the earth 112. As another example, the imaging task can involve the acquisition of a frame of image data from a wide area, and then the acquisition of frames of image data from selected sub-areas using a high dynamic range function. As still another example, the imaging task can include tracking an object 116 moving within a field of view 108 of the imaging system 104. is defined and delivered to the RFPE 208 for handling. However, the imaging task does not need to specify DFPA 204 level commands for implementing the imaging task. Accordingly, where, for example, imaging tasks are sent from a control authority 120 as user commands 436, the DFPA 204 level instructions or commands do not need to be part of what is transmitted over the communication channel 124. In addition to reducing the amount of data that needs to be handled by the communication channel 124, this makes it easier for the command authority to work with imaging systems 104 incorporating different DFPAs 204. In particular, the potentially unique commands required by different DFPAs are abstracted by the RFPE 208, allowing the communication channel 124 to use the same commands for controlling different imaging systems 104.

Image commands 406 for carrying out the defined imaging task are then selected by the RFPE 208 (step 508). For example, this step may be performed by the execution of application programming 236 by the processor 232 of the RFPE 208. Selecting image commands 406 can include selecting one or more image commands 406 for inclusion in a sequence 405 of image commands 406. In addition, time tags 414 are assigned to the individual image commands 406 (step 512). For example, where the imaging task includes acquiring a sequence of images as the platform moves relative to the surface of the earth 112 or another body, the time tags 414 can be assigned to ensure that a desired overlap between adjacent images, a desired area of the body, or the like is achieved. The time tags 414 can be in terms of an absolute reference time, a system time, or a relative time. The image commands 406 in a sequence 405 can express a sequence of frame parameters or commands for execution by the RFPE 208, in order to obtain a set or sequence of images according to parameters specified by the related imaging task. In addition, the image commands 406 can be predefined and stored as part of the RFPE 208, on the host system 216, or on a control authority 120 system, can be acquired from some other source, or can be built by a control authority 120 or user. Each image command 406 can include the acquisition of one or more images or frames of data. For example, an image command 406 directed to the acquisition of a high dynamic range image can include the acquisition of multiple frames of image data in quick succession at different gain levels and/or different exposure or integration times. The image command or commands 406 selected and time tagged in connection with the imaging task are then assigned to a command sequence 405, and placed in the command queue 408 (step 516). Alternatively, the image command or commands 406 and associated time tags 414 can be placed in the command queue 408, without being explicitly assigned to any command sequence 405. In accordance with still other embodiments, entire command sequences 405 can be predefined and selected as appropriate in response to particular imaging tasks. At step 520, a determination can be made as to whether another imaging task remains to be handled. If another imaging task needs to be handled, the process can return to step 508, and commands 406 for the tasks can be selected by the RFPE 208.

If all received imaging tasks have been handled a determination can be made as to whether a control signal 410 to start execution of image commands 406 held in the command queue 408 has been received (step 524). If no such command has been received, the process can return to step 520 to determine whether a new imaging task has been received. In response to receiving a control signal 410 to start execution of imaging tasks, a command sequence 405 or set of image commands 406 and associated time tags 414 are loaded into the state machine 404 (step 528). Loading the image commands 406 into the state machine 404 can include the microsequencer 212 beginning a read operation at a first or next memory address within the command queue 408 containing a command 406.

The state machine 404 creates a DFPA 204 command for each image command, and stores the created command stream in a first-in first-out memory included in the RFPE 208 (step 532). The state machine 404 then commands an output serializer implemented by the microsequencer 212 to send a command stream 424 containing the contents of the first-in first-out memory to the digital focal plane array 204. The command for the current image command 406 or frame can be provided to the DFPA 204 by a focal plane array command formatter 420. The state machine 404 sends the commands 406 to the DFPA 204 for execution at the times indicated by the associated time tags 414 (step 536). For example, after sending the command stream 424 related to the first image command 406, the state machine 404 waits for a period of delay, defined by the specific image command 406. After the period of delay has elapsed, the state machine 404 sends parameters of the next image command 406 as a DFPA control stream 424. In the example illustrated in FIG. 4, there are five image commands 406 loaded as part of the first command sequence 405*a*. The state machine 404 provides each of the commands 406 in sequence as part of the control stream 424. In accordance with embodiments of the present disclosure, each image command 406 in the command sequence 405 is executed one time. In accordance with other embodiments of the present disclosure, the image commands 406 within a command sequence are executed continuously, in order, for a predetermined period of time, until a predetermined number of image operations have been executed, or until a control signal 410 indicating that the execution of the currently loaded command sequence should stop. The command stream 424 for a command 406 can include parameters 440 and parameter values 444 (or alternatively parameter difference values 448) that are passed from the state machine 404 to the DFPA command formatter 428. The DFPA command formatter can provide the parameter values 444 (or 448) to the DFPA 204 for application in the acquisition of an image. In addition, the DFPA command formatter 428 can supply a DFPA clock signal 432 to the DFPA 204, to control the sequencing of operations by the DFPA 204.

After all of the image commands 406 have been executed or after the execution of the commands 406 in the current command sequence 405 (e.g. sequence 405*a*) (step 540), the state machine 404 determines whether additional image commands 406 or command sequences 405 are waiting in the command queue (step 544). If an additional image command 406 or command sequence 405 (e.g. sequence 405*b*) is waiting in the command queue 408, the command or commands 406 are loaded into the state machine 404 and are executed (i.e. the process returns to step 528).

After all of the command sequences 405 in the command queue 408 have been loaded into the state machine 404 and executed, a determination can be made as to whether a command to re-execute some or all of the command sequences 405 held in the command queue has been received or is otherwise in place (step 548). If re-execution is indicated, the process can return to step 516. If re-execution is not indicated, a determination can be made as to whether other imaging tasks have been received (step 552). If additional imaging tasks have been received, the process can return to step 508. Otherwise the process can end.

Figure 6:
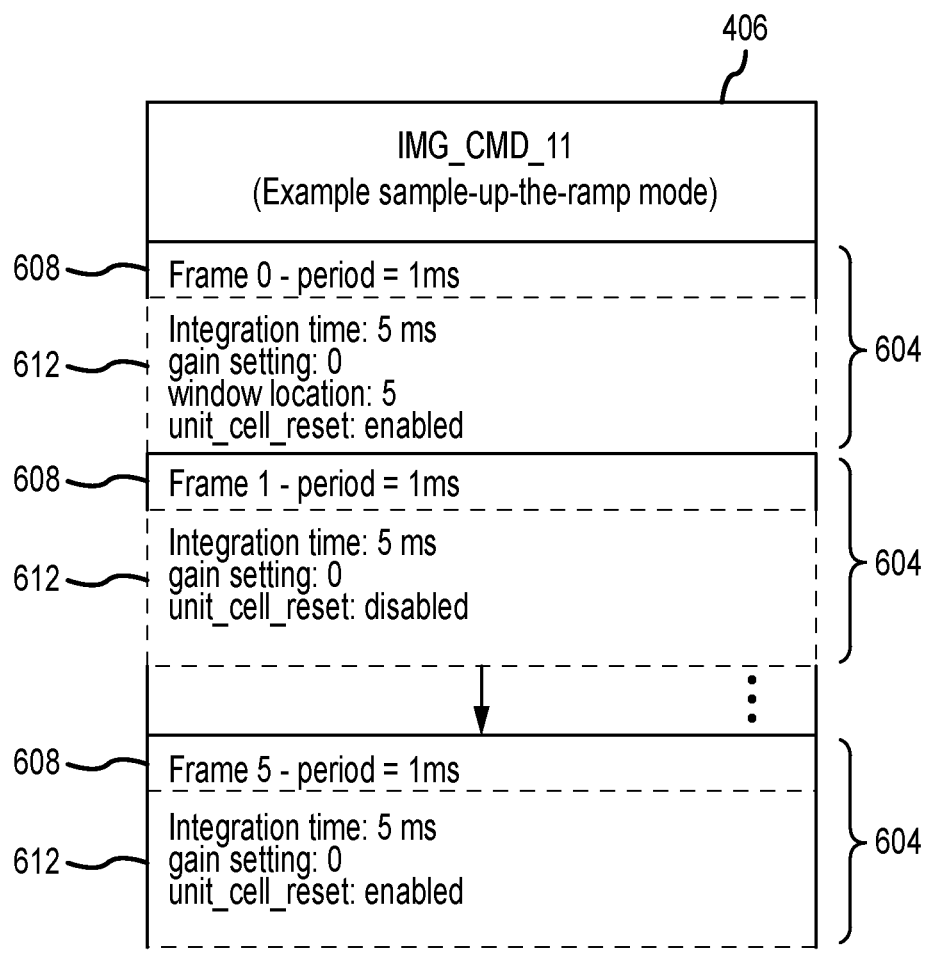
FIG. 6 is an example sequence of frame commands executed by a microsequencer in accordance with embodiments of the present disclosure.

FIG. 6 is an example of the contents of an image command 406, such as may be added to a command queue 408, individually or as part of a command sequence 405. In this example, a number of different frames 604 are specified as part of the image command 406. More particularly, in a first field, a time period 608 for an initial frame (frame 0) is specified. This timing information is utilized by the state machine 404 to properly sequence the operations directed by the image command 406 in time. The time for the acquisition of a particular image frame is followed by a number of parameters 612 defining aspects of the procedure implicated by the command for that frame. In this example, the parameters include an integration time (in milliseconds), a gain setting, a window location, and an indication as to whether a unit cell reset has been enabled. A time period 608 and image frame parameters are given for each of the specified image frames 604. The different parameters can be expressed as differences 448 from a baseline focal plane array 204 configuration, in addition to the relative timing information. Any number of frames having different configurations can be included in a command 406, subject to any applicable memory limitations. The image command 406 illustrated in FIG. 6 is an example of an image command 406 that can be predefined for performing a specific task and stored in the image command library 416 on the RFPE 208. In this example the task is a "sample-up-the-ramp" mode. Other image commands 406 are also typically predefined, stored in the image command library 416 of the RFPE 208, and made available for matching to some or portions of received imaging tasks for performing those imaging tasks. Examples include images formed from a number of images to obtain high dynamic range and/or low noise composite images, images formed in precise time sequences for creating a composite image covering an area larger than an instantaneous field of view 108 of the imaging system 104, images obtained using specified gain levels, integration times, or areas of the DFPA 204, or other variants.

Figure 7:
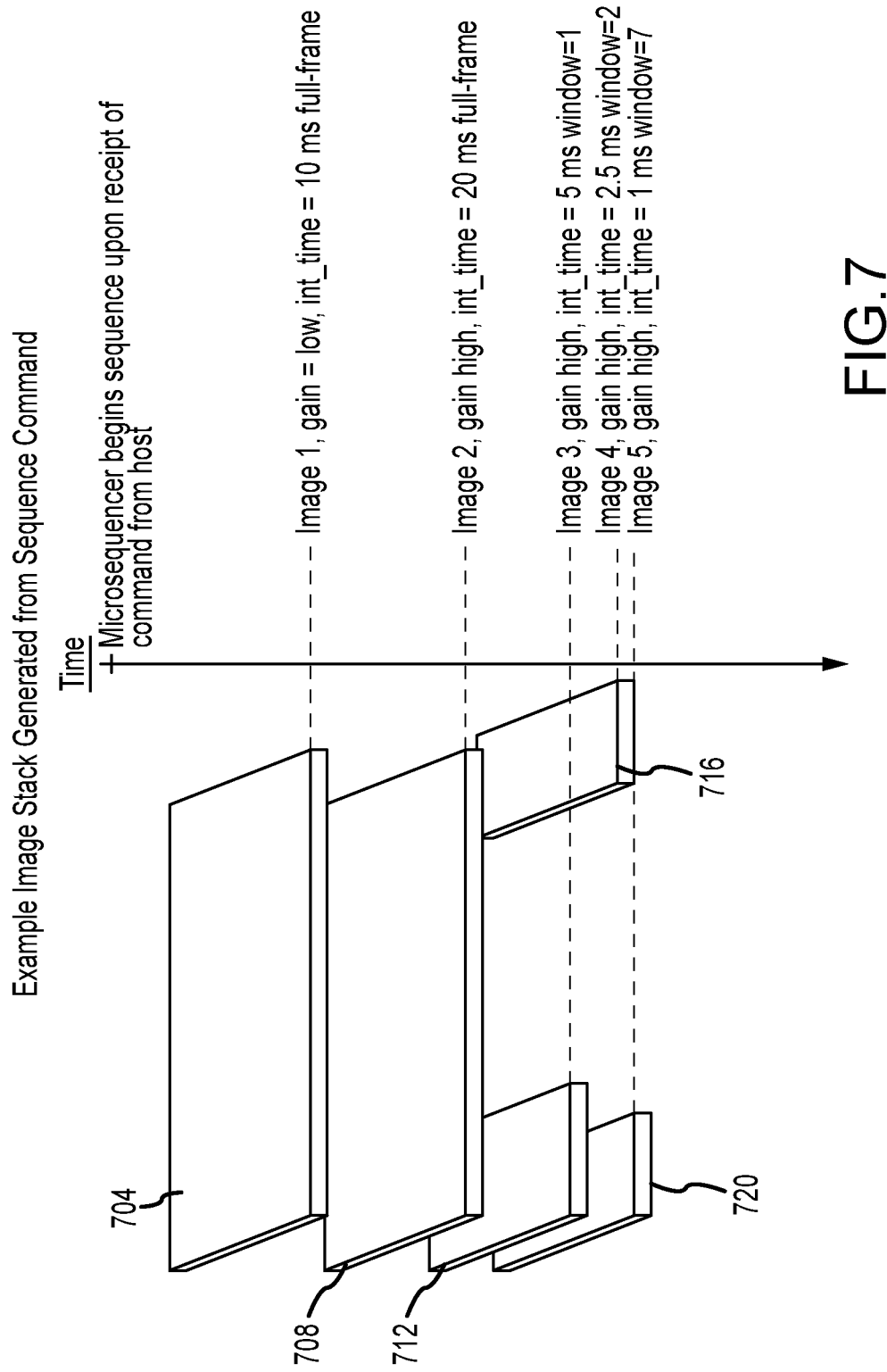
FIG. 7 is an illustration of an image stack generated from an example sequence of frame commands executed by a microsequencer in accordance with embodiments of the present disclosure.

With reference now to FIG. 7, an example sequence or stack of images generated from an example sequence of frame commands is illustrated. Some or all of the frame commands can be implemented within a single image command 406, or can be provided through a sequence of separate image commands 406. In this example, a first image 704 is obtained as a full frame image with a gain set to low, and an integration time set to 10 ms. The second image 708 is also obtained as a full frame image but at a high gain, and with an integration time of 20 ms. The third image 712 is obtained from a window or sob the area of the focal plane array 204 at a high gain, and over an integration time of 5 ms. The fourth image 716 is obtained from a window or sob area of the focal plane array 204 that is different than the window used by the third image 712. The fourth image 716 has acquired using a high gain, and an integration time of 2.5 ms. The fifth image 720 is obtained from a window or sub area of the focal plane array 204 that is partially coextensive with, but different than the window used for the third image 712, and is obtained using a high gain, and an integration times 1 ms. Accordingly, it can be appreciated that embodiments of the present disclosure allowed different areas of a focal plane array to be utilized to obtain image information from different areas within a field of view at the same or different times, and using different gain and integration time values. Moreover, other parameters of the focal plane array can be controlled as part of the sequence of commands.

An imaging system 104 as discussed herein can provide the following capabilities and advantages over other systems:

1) Defining a sequence of time commands, such as combining multiple image collects, typically with the DFPA in a unique gain mode, setting of window modes, or a unique set of integration period during each image, to form a single composite image with extended dynamic range. Other examples include co-adding multiple images taken with identical settings (to improve SNR) and summing hyperspectral line imagery to form 2D spatial images.

2) Implementing a temporal component that provides dynamic, frame-by-frame and intraframe control of the DFPA in different imaging modes, providing each command with an associated execution time tag, so image collections can be precisely synchronized with platform (e.g., spacecraft) system time enabling new mission CONOPS, and 3) Providing an abstraction layer for the DFPA interface to enable a set of common imaging modes (including both simple and sophisticated sequences) that can be reused for different missions. In addition, new image sequences can be uploaded to the RFPE while on orbit, thereby enabling the RFPE 208 to be reconfigured for different missions or to enable new CONOPS over the full life of the instrument.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for operating a digital focal plane array, comprising:
    establishing a plurality of image commands for the digital focal plane array;
    assigning a first set of the image commands to a first image acquisition task;
    placing image commands in the first set of image commands in a command queue;
    assigning a second set of the image commands to a second image acquisition task;
    placing the image commands in the second set of image commands in the command queue;
    receiving an instruction to start execution of image commands held in the command queue;
    in response to receiving the instruction to start execution of image commands held in the command queue, loading the first set of image commands in the command queue into a state machine;
    sending a first command stream from the state machine to the digital focal plane array, wherein the first command stream includes a digital focal plane array command for each of the image commands in the first set of image commands;
    operating the digital focal plane array to acquire at least a first image through execution of the digital focal plane array commands in the first command stream;
    after sending the first command stream, determining whether additional image commands are present in the command queue;
    in response to determining that the second set of image commands are present in the command queue, loading the second set of image commands in the command queue into the state machine;
    sending a second command stream from the state machine to the digital focal plane array, wherein the second command stream includes a digital focal plane array command for each of the image commands in the second set of image commands; and
    operating the digital focal plane array to acquire at least a second image through execution of the digital focal plane array commands in the second command stream.

2. The method of claim 1, wherein the state machine creates a digital focal plane array command for each of the image commands in the first and second sets of image commands.

3. The method of claim 1, wherein each of the image commands placed in the command queue is associated with a time tag.

4. The method of claim 3, wherein the digital focal plane array commands are passed to the digital focal plane array for execution at times indicated by the associated time tag.

5. The method of claim 3, wherein the first and second sets of image commands are different from one another.

6. The method of claim 4, wherein the first and second sets of image commands require a different number of clock cycles to execute.

7. The method of claim 5, wherein the first set of image commands includes commands to acquire a plurality of image frames.

8. The method of claim 2, wherein the state machine provides the digital focal plane array commands to the digital focal plane array in series.

9. The method of claim 1, wherein each of the image commands includes at least one configuration parameter and an associated value.

10. The method of claim 9, wherein the image acquisition tasks are received from a host system that is located remotely relative to the command queue and the digital focal plane array.

11. The method of claim 1, wherein at least a first parameter for operation of the digital focal plane array is specified as part of an image command included in the first set of image commands, and wherein at least a second parameter for operation of the digital focal plane array is specified by a set of baseline parameters.

12. The method of claim 1, wherein at least a first parameter for operation of the digital focal plane array is specified as a difference from a baseline first parameter.

13. The method of claim 8, wherein a first image command included in the first set of image commands and a second image command included in the first set of image commands specify use of different areas of the digital focal plane array for acquiring an image frame.

14. An imaging system, comprising:
    a digital focal plane array;
    reconfigurable focal plane electronics, including:
        a memory;
        application programming stored in the memory;
        a plurality of image commands stored in the memory;

a processor, wherein the processor is operable to execute the application programming, wherein execution of the application programming includes:

placing a first set of the image commands in a command queue;

placing a second set of the image commands in the command queue;

in response to receiving a command to start execution of image commands, loading the first set of image commands into a state machine, formatting the image commands in the first set of image commands for execution by the digital focal plane array, and supplying the formatted image commands and a clock signal to the digital focal plane array, wherein a first set of images is acquired;

after supplying the formatted first set of image commands to the digital focal plane array, determining that the second set of image commands remain in the command queue; and in response to determining that the second set of image commands remain in the command queue, loading the second set of image commands into the state machine, formatting the image commands in the second set of image commands for execution by the digital focal plane array, and supplying the formatted image commands and the clock signal to the digital focal plane array, wherein a second set of images is acquired.

15. The system of claim 14, wherein the clock signal is a system time signal.

16. The system of claim 15, further comprising:
a host system.

17. The system of claim 16, wherein the clock signal is supplied by the host system.

18. The system of claim 14, wherein at least one of the image commands stored in the memory includes time and image parameters for a plurality of image frames.

19. A system, comprising:
a platform;
an imaging system carried by the platform, the imaging system including:
a digital focal plane array;
reconfigurable focal plane electronics, including:
a memory;
application programming stored in the memory;
a plurality of image commands stored in the memory;
a processor;
a control authority, wherein at least first and second imaging tasks are provided from the control authority to the imaging system over a communication link, wherein the processor is operable to execute the application programming, and wherein execution of the application programming includes:

selecting a first set of image commands from the memory in response to the provided first imaging task and placing the first set of image commands in a command queue;

selecting a second set of image commands from the memory in response to the provided second imaging task and placing the second set of image commands in the command queue;

placing the first set of image commands in a state machine;

formatting the first set of image commands for execution by the digital focal plane array;

supplying the formatted first set of image commands and a clock signal to the digital focal plane array, wherein at least a first image is acquired;

placing the second set of image commands in the state machine;

formatting the second set of image commands for execution by the digital focal plane array; and supplying the formatted second set of image commands and the clock signal to the digital focal plane array, wherein at least a second image is acquired.

20. The system of claim 19, wherein the platform is a satellite, wherein the control authority is ground based, and wherein the communication link is a wireless communication link.

* * * * *